United States Patent
Kobayashi et al.

(10) Patent No.: US 9,262,017 B2
(45) Date of Patent: Feb. 16, 2016

(54) CAPCITIVE TOUCH PANEL WITH SIMULTANEOUSLY ENABLED X- AND Y-DIRECTION SENSOR CIRCUITS WHEREIN IN EACH SENSOR CIRCUIT THE DRIVE LINE IS INTERDIGITATED WITH A PLURALITY OF SENSE LINES

(75) Inventors: Kazuyuki Kobayashi, Midori (JP); Tatsuya Suzuki, Kumagaya (JP); Kumiko Fukai, Ora-gun (JP); Yasuhiro Kaneta, Isesaki (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 438 days.

(21) Appl. No.: 12/794,281

(22) Filed: Jun. 4, 2010

(65) Prior Publication Data

US 2010/0309165 A1 Dec. 9, 2010

(30) Foreign Application Priority Data

Jun. 5, 2009 (JP) ................. 2009-136079

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ... G06F 3/03547; G06F 3/046; G06F 3/0412; G06F 3/044; G06F 2203/04107; G06F 3/0416–3/0418; G06F 3/047
USPC ...................... 345/173–184; 178/18.03–19.07
See application file for complete search history.

(56) References Cited

U.S. PATENT DOCUMENTS

| | | | | |
|---|---|---|---|---|
| 4,205,199 A | * | 5/1980 | Mochizuki ................. | 178/18.03 |
| 4,700,022 A | * | 10/1987 | Salvador et al. ........... | 178/20.03 |
| 4,873,400 A | * | 10/1989 | Rapp et al. ................. | 178/18.05 |
| 2003/0052867 A1 | * | 3/2003 | Shigetaka et al. ............ | 345/173 |
| 2005/0280638 A1 | * | 12/2005 | Oda .............................. | 345/173 |
| 2006/0119590 A1 | * | 6/2006 | Park et al. ..................... | 345/175 |
| 2007/0063987 A1 | * | 3/2007 | Sato et al. ..................... | 345/173 |
| 2007/0132724 A1 | * | 6/2007 | Muranaka ..................... | 345/156 |
| 2007/0138513 A1 | * | 6/2007 | Sato et al. ..................... | 257/239 |
| 2007/0257894 A1 | * | 11/2007 | Philipp ......................... | 345/173 |
| 2008/0088595 A1 | * | 4/2008 | Liu et al. ....................... | 345/173 |
| 2008/0158178 A1 | * | 7/2008 | Hotelling et al. ............. | 345/173 |
| 2008/0164076 A1 | * | 7/2008 | Orsley ......................... | 178/18.01 |

(Continued)

FOREIGN PATENT DOCUMENTS

| | | |
|---|---|---|
| JP | 2005-190950 | 7/2005 |
| JP | 2007-172028 A | 7/2007 |

*Primary Examiner* — Chanh Nguyen
*Assistant Examiner* — Navin Lingaraju
(74) *Attorney, Agent, or Firm* — Rennie William Dover

(57) ABSTRACT

There is offered a signal processing circuit of the electrostatic capacity type touch panel which can eliminate duplication of components to reduce a cost of the components. A touch panel 51 is formed on a glass substrate 200. Sensor circuits 50A and 50B are arrayed in a Y direction, and sensor circuits 50C and 50D are arrayed in an X direction on the periphery of the touch pane 51. Serial clock terminals SCL of the sensor circuits 50A-50D are connected to a serial clock line 53 all together, while serial data terminals SDA are connected to a serial data line 54 all together. A microcomputer 52 is disposed on a PCB substrate outside the glass substrate 200. Data communication can be performed between the microcomputer 52 and the sensor circuits 50A-50D through the serial clock line 53 and the serial data line 54.

20 Claims, 10 Drawing Sheets

(56) References Cited

U.S. PATENT DOCUMENTS

| | | | |
|---|---|---|---|
| 2008/0225015 A1* | 9/2008 | Hashida | 345/173 |
| 2009/0009485 A1* | 1/2009 | Bytheway | 345/174 |
| 2009/0167325 A1* | 7/2009 | Geaghan | 324/660 |
| 2009/0211818 A1* | 8/2009 | Kondo et al. | 178/18.03 |
| 2009/0289918 A1* | 11/2009 | Muranaka | 345/174 |
| 2011/0062974 A1* | 3/2011 | Day et al. | 324/713 |
| 2012/0133614 A1* | 5/2012 | Bytheway et al. | 345/174 |
| 2013/0037330 A1* | 2/2013 | Singh | 178/18.06 |

* cited by examiner

FIG.1A  CA1 > CA2
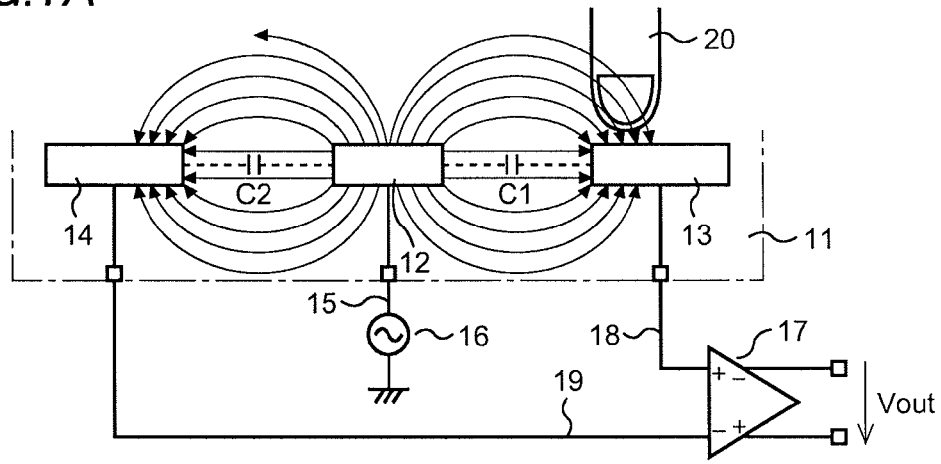
FIG.1B  CA1 = CA2
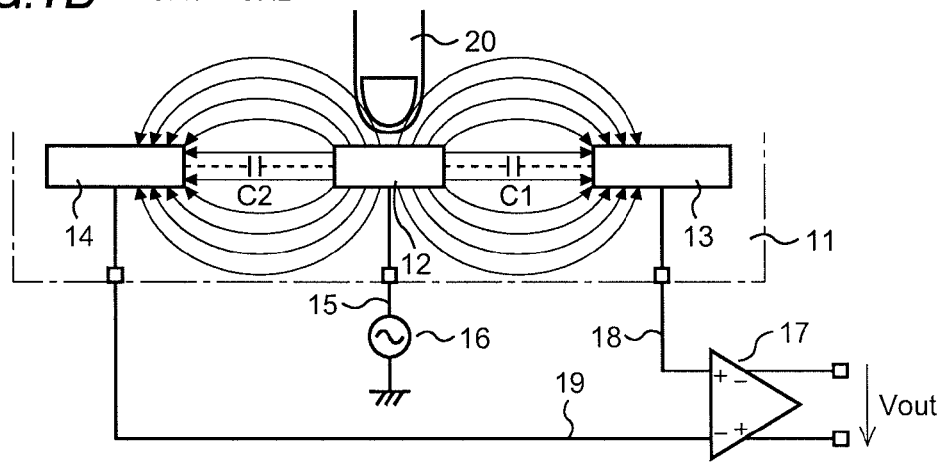
FIG.1C  CA1 < CA2
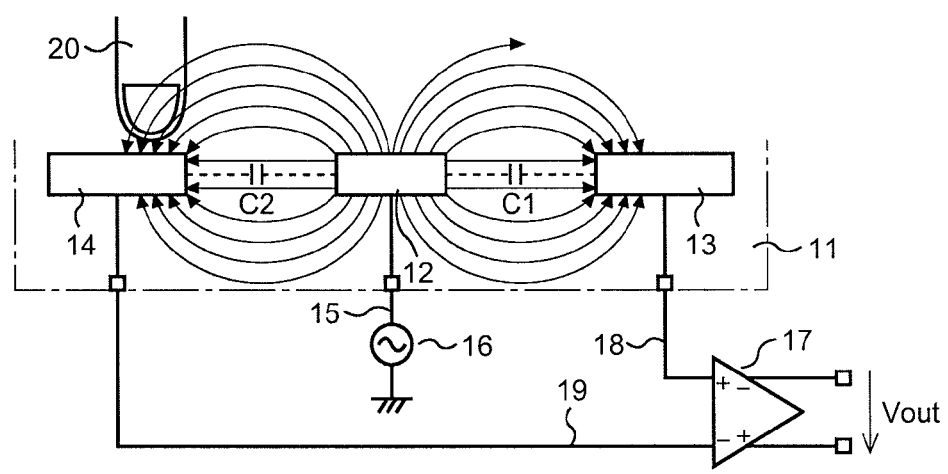

CHARGE ACCUMULATION MODE

CHARGE TRANSFER MODE

CAPCITIVE TOUCH PANEL WITH SIMULTANEOUSLY ENABLED X- AND Y-DIRECTION SENSOR CIRCUITS WHEREIN IN EACH SENSOR CIRCUIT THE DRIVE LINE IS INTERDIGITATED WITH A PLURALITY OF SENSE LINES

CROSS-REFERENCE OF THE INVENTION

This application claims priority from Japanese Patent Application No. 2009-136079, the content of which is incorporated herein by reference in its entirety.

BACKGROUND OF THE INVENTION

1. Field of the Invention

This invention relates to a signal processing circuit of an electrostatic capacity type touch panel.

2. Description of the Related Art

The electrostatic capacity type touch panel has been known as an input device to various kinds of electronic devices such as a mobile phone, a portable audio device, a portable game console, a television and a personal computer.

FIG. 12 is a plan view of the electrostatic capacity type touch panel 101. The touch panel 101 is formed on a glass substrate 100, as shown in the drawing. A plurality of sensor circuits 102A and 102B made of IC chips is disposed on a periphery of the large touch panel 101 using a COG (Chip On Glass) technology.

The sensor circuits 102A and 102B detect a change in a capacitance of a capacitor located at a touch position on the touch panel 101. Results of the detection are processed by a microcomputer incorporated in each of the sensor circuits 102A and 102B so as to determine coordinates of the location of the touch position. Technologies mentioned above are disclosed in Japanese Patent Application Publication No. 2005-190950, for example.

However, there is a problem that components are duplicated and a cost of the components is increased since each of the plurality of sensor circuits 102A and 102B incorporates the microcomputer respectively in the conventional electrostatic capacity type touch panel.

SUMMARY OF THE INVENTION

This invention provides a signal processing circuit of an electrostatic capacity type touch panel. The electrostatic capacity type touch panel includes a plurality of first sense lines extending over a substrate, a first drive line extending along on both sides of each of the first sense lines, a plurality of second sense lines extending over the substrate and intersecting with the plurality of first sense lines and a second drive line extending along on both sides of each of the second sense lines. The signal processing circuit includes a first sensor circuit to detect a change in a capacitance between the first sense line and the first drive line and to output a first detection signal, a second sensor circuit to detect a change in a capacitance between the second sense line and the second drive line and to output a second detection signal, and a bus connected to the first and second sensor circuits and capable of outputting the first and second detection signals so that data communication is performed between a master device and the first and second sensor circuits through the bus.

BRIEF DESCRIPTION OF THE DRAWINGS

FIGS. 1A, 1B and 1C show principles of an electrostatic capacity type touch sensor according to embodiments of this invention.

DETAILED DESCRIPTION OF THE INVENTION

Figure 2:
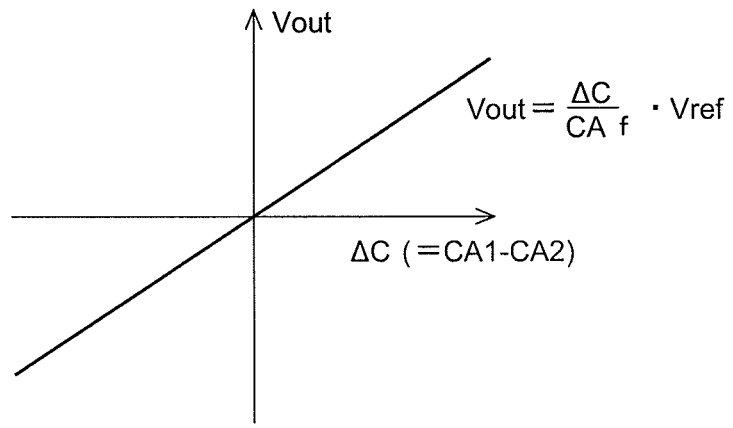
FIG. 2 shows input/output characteristics of an electric charge amplifier.

A signal processing circuit of an electrostatic capacity type touch panel according to an embodiment of this invention is hereafter described referring to the drawings. First, basic principles of the signal processing circuit are explained referring to FIGS. 1A through 4B.

An excitation pad 12, a first touch pad 13 and a second touch pad 14 are disposed on a substrate 11 such as a PCB substrate in a way that the excitation pad 12 is interposed between the first and second touch pads 13 and 14, as shown in FIGS. 1A, 1B and 1C. A dielectric layer (not shown) is formed between the excitation pad 12 and each of the first and second touch pads 13 and 14.

That is, a first electrostatic capacitor C1 is formed of the excitation pad 12 and the first touch pad 13. Similarly, a second electrostatic capacitor C2 is formed of the excitation pad 12 and the second touch pad 14. The first electrostatic capacitor C1 has a capacitance CA1, while the second electrostatic capacitor C2 has a capacitance CA2. It is preferable that the capacitances CA1 and CA2 are set to be equal to each other in an initial state. Since the excitation pad 12 and the first and second touch pads 13 and 14 are electrodes, it is preferable that surfaces of these electrodes are covered with an insulator such as plastic, wood or rubber.

On the other hand, an alternating current power supply 16 that provides the excitation pad 12 with an alternating voltage through a wiring 15 is provided on a side of the signal processing circuit (IC). Amplitude of the alternating voltage is referred to as an excitation voltage Vref. Also, there is provided an electric charge amplifier 17. The first touch pad 13 is connected to a non-inverting input terminal (+) of the electric charge amplifier 17 through an wiring 18, while the second touch pad 14 is connected to an inverting input terminal (−) of the electric charge amplifier 17 through a wiring 19.

The electric charge amplifier 17 generates a voltage corresponding to a difference between the capacitance CA1 of the first capacitor C1 formed between the excitation pad 12 and the first touch pad 13 and the capacitance CA2 of the second capacitor C2 formed between the excitation pad 12 and the second touch pad 14.

Figure 3:
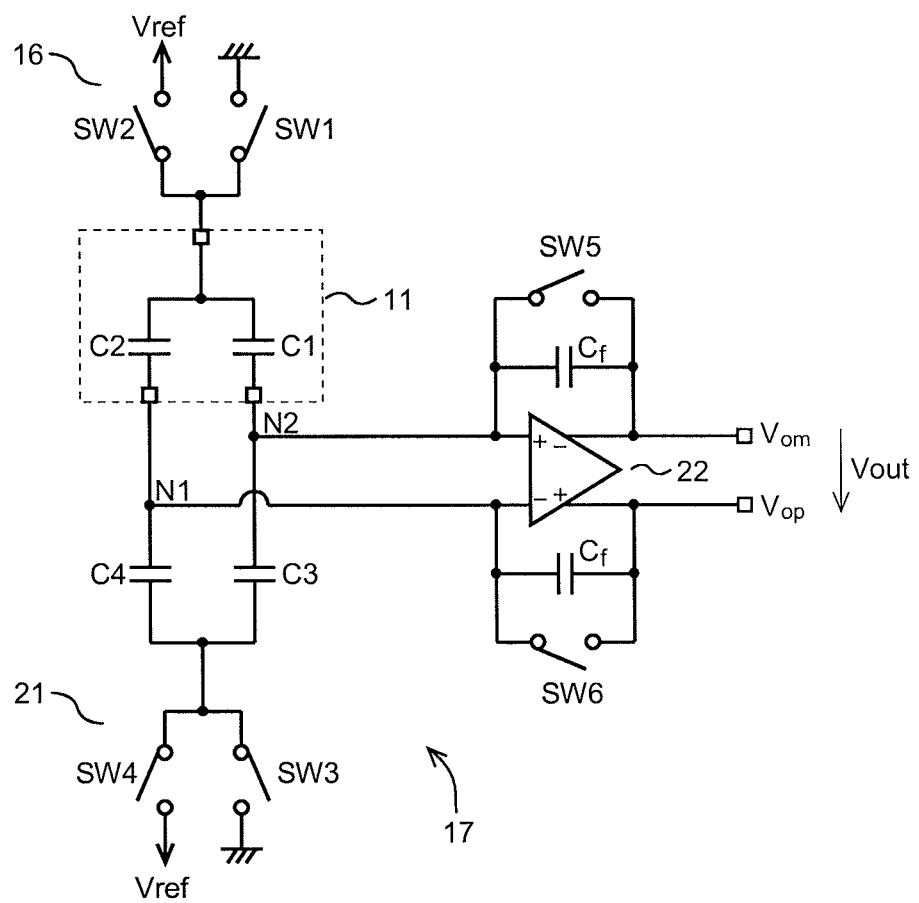
FIG. 3 is a circuit diagram of the electric charge amplifier.
Figure 4A:
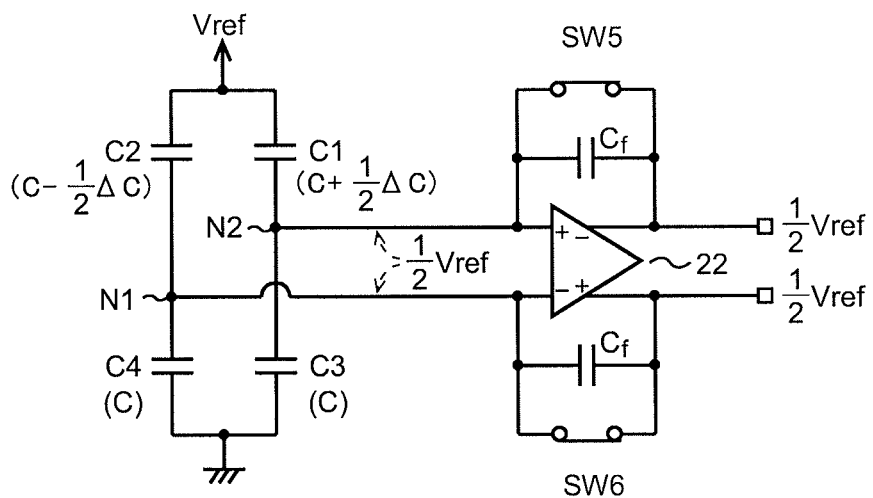
FIGS. 4A and 4B show operations of the electric charge amplifier.
Figure 4B:
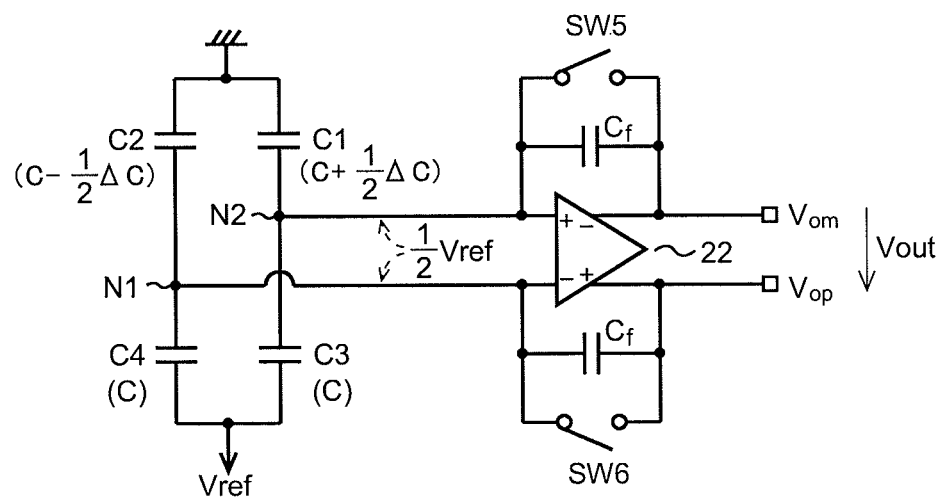

An example of a concrete structure of the electric charge amplifier 17 is described hereafter referring to FIG. 3, FIG. 4A and FIG. 4B. The first capacitor C1 and the second capacitor C2 are formed on the substrate 11 that is depicted as a portion encircled by a dashed line in FIG. 3. Portions of the structure shown in FIG. 3 except for the substrate 11 make the signal processing circuit.

The alternating current power supply 16 is formed of switches SW1 and SW2 that are switched alternately. The alternating current power supply 16 outputs a ground voltage (0 V) when the switch SW1 is closed and the switch SW2 is opened, and outputs the excitation voltage Vref (positive voltage) when the switch SW1 is opened and the switch SW2 is closed. In this case, the alternating current power supply 16 outputs a clock signal voltage alternating between the excitation voltage Vref (H level) and 0 V (L level).

A third electrostatic capacitor C3 is connected in series with the first electrostatic capacitor C1, while a fourth electrostatic capacitor C4 is connected in series with the second electrostatic capacitor C2. It is preferable that a capacitance CA3 of the third electrostatic capacitors C3 and a capacitance CA4 of the fourth electrostatic capacitor C4 are equal to each other and approximately equal to the capacitances CA1 and CA2.

An alternating current power supply 21, that is similar to the alternating current power supply 16, is connected to a connecting node between the third capacitor C3 and the fourth capacitor C4. The alternating current power supply 21 is formed of switches SW3 and SW4 that are switched alternately. The alternating current power supply 21 outputs the ground voltage (0 V) when the switch SW3 is closed and the switch SW4 is opened, and outputs the excitation voltage Vref (positive voltage) when the switch SW3 is opened and the switch SW4 is closed. The alternating current power supply 16 and the alternating current power supply 21 output the clock signal voltages that are opposite in phase to each other.

A wiring drawn out from a connecting node N2 between the first and third electrostatic capacitors C1 and C3 is connected to a non-inverting input terminal (+) of an ordinary differential amplifier 22, while a wiring drawn out from a connecting node N1 between the second and fourth electrostatic capacitors C2 and C4 is connected to an inverting input terminal (−) of the differential amplifier 22.

A feedback capacitor Cf is connected between an inverting output terminal (−) and the non-inverting input terminal (+) of the differential amplifier 22, while an identical feedback capacitor Cf is connected between a non-inverting output terminal (+) and the inverting input terminal (−) of the differential amplifier 22. Each of the feedback capacitors Cf has a capacitance CAf.

A switch SW5 is connected between the inverting output terminal (−) and the non-inverting input terminal (+) of the differential amplifier 22, while a switch SW6 is connected between the non-inverting output terminal (+) and the inverting input terminal (−) of the differential amplifier 22. The switches SW5 and SW6 are switched simultaneously. That is, when the switches SW5 and SW6 are closed, the inverting output terminal (−) and the non-inverting input terminal (+) of the differential amplifier 22 are short-circuited while the non-inverting output terminal (+) and the inverting input terminal (−) of the differential amplifier 22 are short-circuited.

A voltage difference between an output voltage Vom from the inverting output terminal (−) of the differential amplifier 22 and an output voltage Vop from the non-inverting output terminal (+) of the differential amplifier 22 is represented by Vout (=Vop−Vom).

Next, operations of the circuit structured as described above will be explained referring to FIGS. 4A and 4B. The circuit has a charge accumulation mode and a charge transfer mode that alternate a multitude of times.

In the charge accumulation mode that is shown in FIG. 4A, the excitation voltage Vref is applied to the first and second electrostatic capacitors C1 and C2 by opening SW1 and closing SW2 of the alternating current power supply 16. Also the ground voltage (0 V) is applied to the third and fourth electrostatic capacitors C3 and C4 by opening SW4 and closing SW3 of the alternating current power supply 21.

Also, SW5 and SW6 are closed. With this, the inverting output terminal (−) and the non-inverting input terminal (+) of the differential amplifier 22 are short-circuited while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) all become ½ Vref. Here, a common mode voltage of the differential amplifier 22 is ½ Vref, which is a half of the excitation voltage Vref.

Next, in the charge transfer mode that is shown in FIG. 4B, the ground voltage (0 V) is applied to the first and second electrostatic capacitors C1 and C2 by closing SW1 and opening SW2 of the alternating current power supply 16. Also, the excitation voltage Vref is applied to the third and fourth electrostatic capacitors C3 and C4 by closing SW4 and opening SW3 of the alternating current power supply 21. Also, SW5 and SW6 are opened.

After that, the circuit returns to the charge accumulation mode shown in FIG. 4A, and then turns to the charge transfer mode again. The electric charge amplifier 17 reaches a stable state after repeating the operations described above a multitude of times.

In this case, CA3=CA4=C, where C is each of the capacitances CA1 and CA2 in the initial state. When a finger 20 of an operator approaches the touch pad 13 or 14, there is caused a capacitance difference ΔC between the capacitances CA1 and CA2. That is, CA1−CA2=ΔC. Then, equations CA1=C+½ΔC and CA2=C−½ΔC hold.

In the charge accumulation mode, $$\text{Amount of Electric Charges at } N1 = \left(C - \frac{1}{2}\Delta C\right)\cdot\left(-\frac{1}{2}Vref\right) + C\cdot\left(\frac{1}{2}Vref\right) + CAf \cdot 0 \quad \text{[Equation 1]}$$

where (C−½ΔC)·(−½ Vref) represents an amount of electric charges stored in C2, C·(½ Vref) represents an amount of electric charges stored in C4, and CAf·0 (=0) represents an amount of electric charges stored in Cf.

In the charge transfer mode, $$\text{Amount of Electric Charges at } N1 = \left(C - \frac{1}{2}\Delta C\right)\cdot\left(\frac{1}{2}Vref\right) + C\cdot\left(-\frac{1}{2}Vref\right) + CAf\cdot\left(Vop - \frac{1}{2}Vref\right) \quad \text{[Equation 2]}$$

where (C−½ΔC)·(½ Vref) represents an amount of electric charges stored in C2, C·(−½ Vref) represents an amount of electric charges stored in C4, and CAf·(Vop−½ Vref) represents an amount of electric charges stored in Cf. [Equation 1]=[Equation 2] holds, since the amount of electric charges at N1 in the charge accumulation mode is equal to the amount of electric charges at N1 in the charge transfer mode according to the law of conservation of electric charge.

Following equation is obtained by solving [Equation 1]= [Equation 2] for Vop.

$$Vop = \left(1 + \frac{\Delta C}{CAf}\right) \cdot \frac{1}{2} Vref \qquad \text{[Equation 3]}$$

Similarly, following equation is obtained by applying the law of conservation of electric charge to the electric charges at the node N2 and solving the resulting equation for Vom.

$$Vom = \left(1 - \frac{\Delta C}{CAf}\right) \cdot \frac{1}{2} Vref \qquad \text{[Equation 4]}$$

Vout is obtained from [Equation 3] and [Equation 4].

$$Vout = Vop - Vom = \frac{\Delta C}{CAf} \cdot Vref \qquad \text{[Equation 5]}$$

That is, it is understood that the output voltage Vout of the electric charge amplifier 17 varies proportionally to the capacitance difference $\Delta C$ between the capacitances CA1 and CA2, as shown in FIG. 2.

Principles of the operations of a touch sensor are hereafter explained referring to FIGS. 1A, 1B and 1C. In the following explanation, the capacitances CA1 and CA2 of the electrostatic capacitors C1 and C2, each formed between the excitation pad 12 and each of the first and second touch pads 13 and 14, respectively, are equal to each other, that is, CA1=CA2=C in the initial state in which the finger 20 of the operator is far away from the touch pads 13 and 14. The explanation is given based on a dielectric model in which the finger 20 of the operator is regarded as a dielectric that is electrically floating.

First, when the finger 20 of the operator approaches the first touch pad 13 as shown in FIG. 1A, an electric field between the first touch pad 13 and the excitation pad 12 is varied so that the capacitance CA1 of the capacitor C1 formed between the first touch pad 13 and the excitation pad 12 becomes larger compared with the capacitance CA2 (CA1>CA2).

This is because the number of lines of electric force originating from the excitation pad 12 and terminating at the first touch pad 13 is increased by that the finger 20 of the operator approaches the touch pad 13. In this case, the output voltage Vout of the electric charge amplifier 17 becomes positive (+) as derived from the equation 5. The same result is obtained when a dielectric such as an eraser approaches the first touch pad 13 instead of the finger 20 of the operator.

When the finger 20 of the operator is placed right above the excitation pad 12 as shown in FIG. 1B, the capacitance CA1 and the capacitance CA2 become equal to each other (CA1=CA2). In this case, the output voltage Vout of the electric charge amplifier 17 becomes 0 V.

When the finger 20 of the operator approaches the second touch pad 14 as shown in FIG. 1C, an electric field between the second touch pad 14 and the excitation pad 12 is varied so that the capacitance CA2 of the capacitor C2 formed between the second touch pad 14 and the excitation pad 12 becomes larger compared with the capacitance CA1 (CA2>CA1). In this case, the output voltage Vout of the electric charge amplifier 17 becomes negative (−) as derived from the equation 5.

The touch sensor described above can be used as an ON/OFF switch, since the output voltage Vout of the electric charge amplifier 17 is turned to the positive (+) voltage when the finger 20 of the operator approaches the first touch pad 13. Besides, the output voltage Vout of the electric charge amplifier 17 varies linearly with $\Delta C$. That is, the closer the finger 20 of the operator approaches to the first touch pad 13, the larger becomes the positive output voltage Vout. Conversely, the closer the finger 20 of the operator approaches to the second touch pad 14, the larger becomes an absolute value of the negative output voltage Vout. Therefore, linear detection (analog detection) of the touch position of the finger 20 of the operator is made possible by utilizing the characteristics described above.

In addition, noise immunity can be improved with the touch sensor described above, since differential capacitance detection is adopted. That is, when a noise is applied to the first and second touch pads 13 and 14, an influence of the noise on the first touch pad 13 and an influence of the noise on the second touch pad 14 are cancelled out by each other so that the influence of the noise is suppressed from appearing in the output voltage Vout of the electric charge amplifier 17. Furthermore, since there is no influence of parasitic capacitances of the first and second touch pads 13 and 14 and the wirings 15, 18 and 19, no restriction is imposed on patterning of the touch pads and the like, enabling arbitrary patterning.

Above explanation is based on the dielectric model in which the finger 20 of the operator is regarded as a dielectric. When the finger 20 of the operator is grounded, on the other hand, an electric field shielding model applies. In this case, the finger 20 of the operator serves to shield the electric field so that the relative magnitude of the capacitance CA1 to the capacitance CA2 is reversed. That is, in the electric field shielding model, when the finger 20 of the operator approaches the first touch pad 13, the number of the lines of electric force originating from the excitation pad 12 and terminating at the first touch pad 13 is decreased because a part of the lines of electric force originating from the excitation pad 12 terminates at the finger 20 of the operator. As a result, the capacitance CA1 becomes smaller compared with the capacitance CA2 (CA1<CA2). Which of the dielectric model and the electric field shielding model applies is determined depending on the electrical state of the finger 20 of the operator or its alternative (a pen, an eraser or the like). However, there is no difference in that the touch position can be detected based on the changes in the capacitances, since only difference in the case where the electric field shielding model applies is that the relative magnitude of capacitance CA2 to the capacitance CA1 is reversed. The signal processing circuits according to the embodiments of this invention described below are explained based on the dielectric model.

Figure 5:
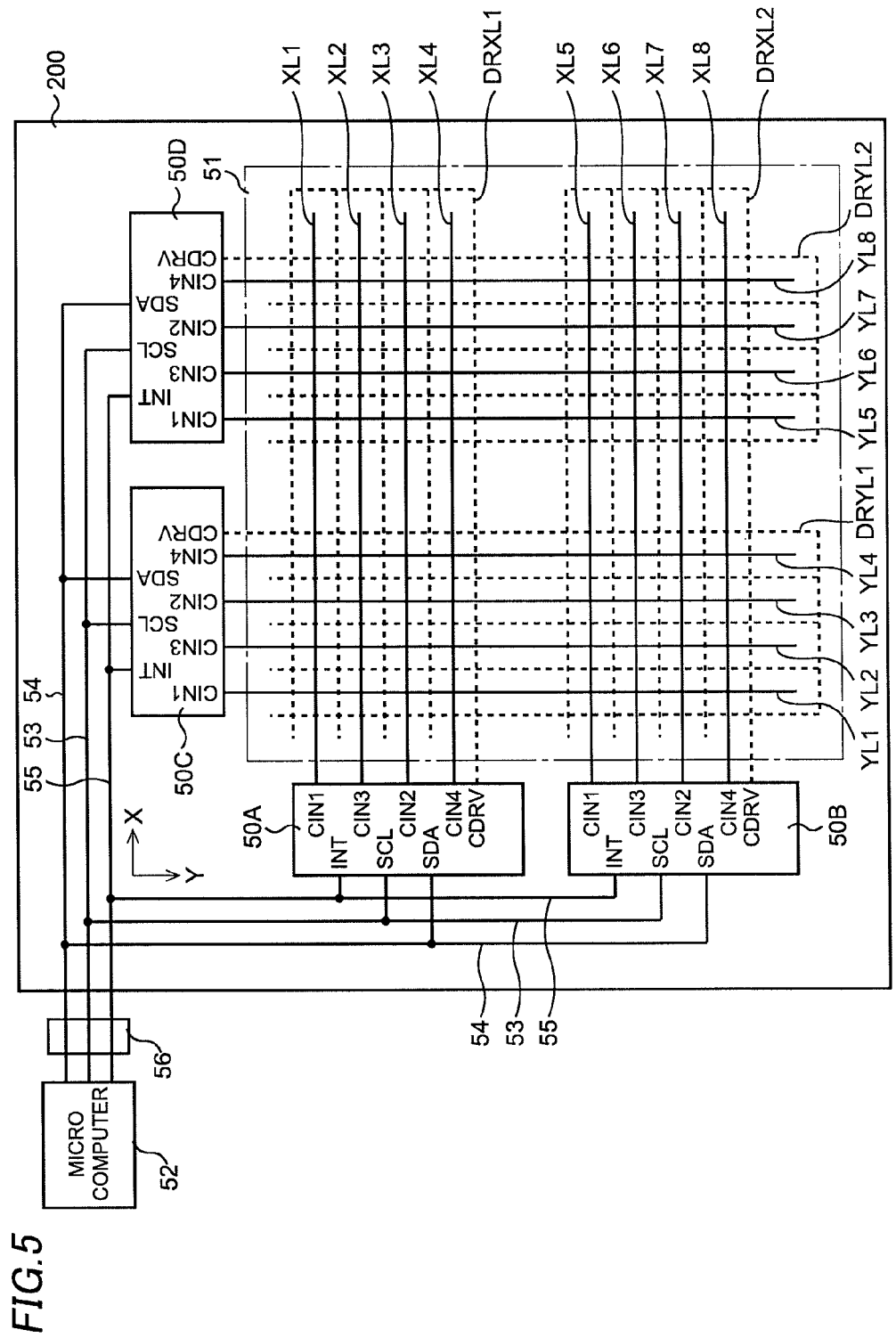
FIG. 5 shows a signal processing circuit of an electrostatic capacity type touch panel according a first embodiment of this invention.
Figure 6:
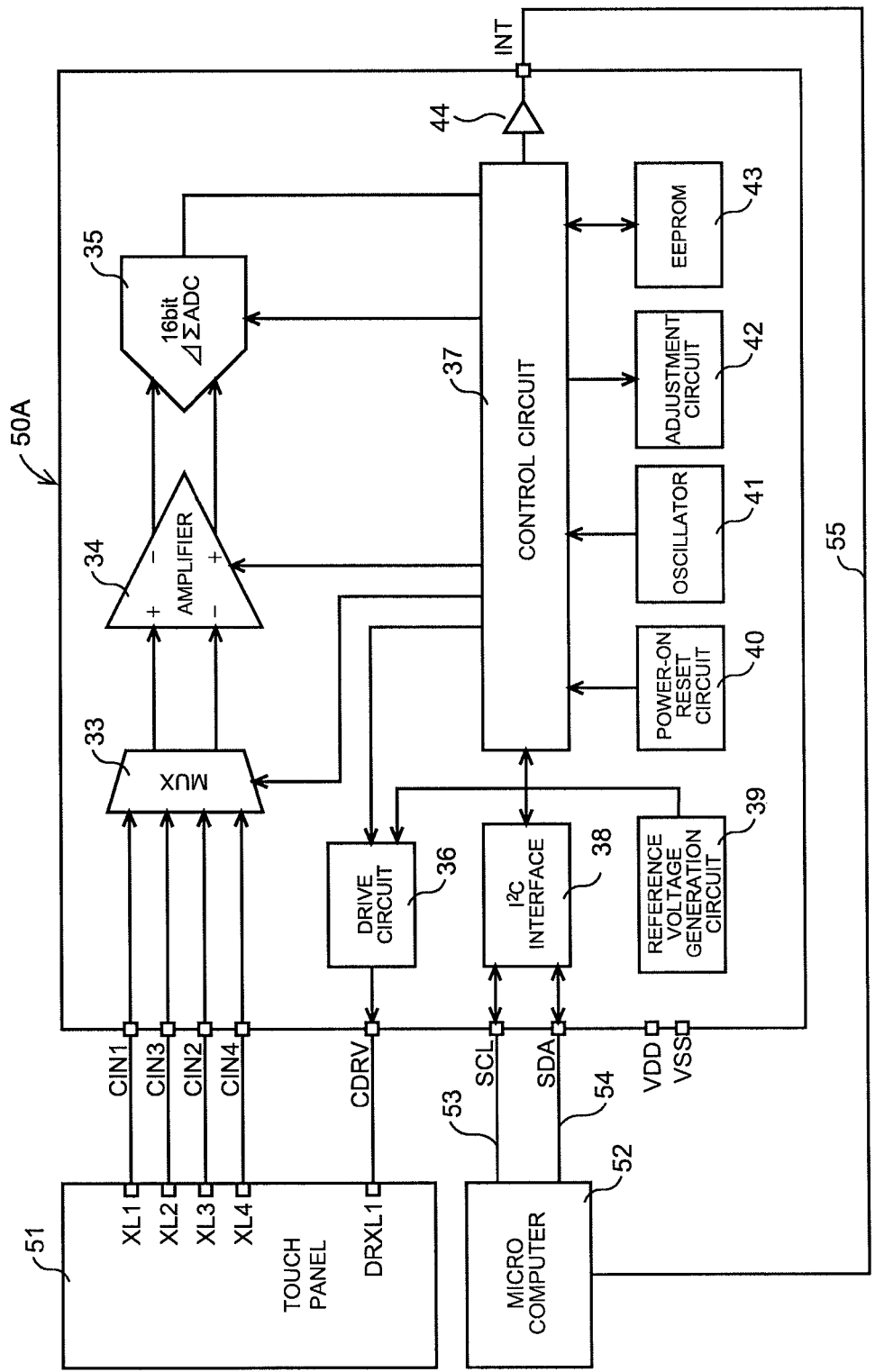
FIG. 6 shows a system structure of a sensor circuit.
Figure 7:
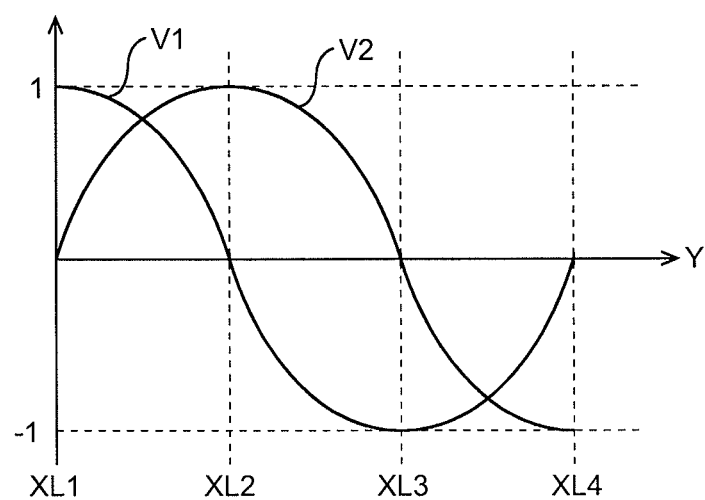
FIG. 7 shows waveforms of outputs of the signal processing circuit of the electrostatic capacity type touch panel according the first embodiment of this invention.

The signal processing circuit of an electrostatic capacity type touch panel according to a first embodiment of this invention is described referring to FIG. 5 through FIG. 7. FIG. 5 shows the signal processing circuit of the electrostatic capacity type touch panel according to the first embodiment of this invention. FIG. 6 shows a system structure of a sensor circuit 50A that is shown in FIG. 5.

The touch panel 51 is formed on a glass substrate 200, as shown in FIG. 5. On the periphery of the touch panel 51, sensor circuits 50A and 50B are arrayed in a Y direction, and sensor circuits 50C and 50D are arrayed in an X direction. The sensor circuits 50A-50D are made of IC chips, and are formed on the glass substrate 200 using the COG (Chip On Glass) technology.

The touch panel 51 has X lines XL1-XL8 and X drive lines DRXL1 and DRXL2 extending in the X direction on the glass substrate 200. The X drive line DRXL1 is disposed on both sides of each of the X lines XL1-XL4, and the X drive line DRXL2 is disposed on both sides of each of the X lines XL5-XL8. Each of the X drive line DRXL1 and DRXL2 corresponds to the excitation pad 12 shown in FIG. 1A to FIG. 1C.

In addition, the touch panel 51 has Y lines YL1-YL8 and Y drive lines DRYL1 and DRYL2 extending in the Y direction on the glass substrate 200. The Y lines YL1-YL8 and the Y drive lines DRYL1 and DRYL2 intersect with the X lines XL1-XL8 and the X drive lines DRXL1 and DRXL2, and are electrically insulated from each other. The Y drive line DRYL1 is disposed on both sides of each of the Y lines YL1-YL4, and the Y drive line DRYL2 is disposed on both sides of each of the Y lines YL5-YL8. Each of the Y drive line DRYL1 and DRYL2 corresponds to the excitation pad 12 shown in FIG. 1A to FIG. 1C.

A first input terminal CIN1 of the sensor circuit 50A is connected to the X line XL1, its second input terminal CIN2 is connected to the X line XL3, its third input terminal CIN3 is connected to the X line XL2, and its fourth input terminal CIN4 is connected to the X line XL4. A drive terminal CDRV of the sensor circuit 50A is connected to the X drive line DRXL1. Similarly, a first input terminal CIN1 of the sensor circuit 50C is connected to the Y line YL1, its second input terminal CIN2 is connected to the Y line YL3, its third input terminal CIN3 is connected to the Y line YL2, and its fourth input terminal CIN4 is connected to the Y line YL4. A drive terminal CDRV of the sensor circuit 50C is connected to the Y drive line DRYL1. The sensor circuits 50B and 50D are connected in the same way as described above.

Each of the sensor circuits 50A-50D has a serial clock terminal SCL, a serial data terminal SDA and an interrupt flag output terminal INT. A serial clock line 53, a serial data line 54 and an interrupt flag line 55 are formed on the glass substrate 200.

All the serial clock terminals SCL of the sensor circuits 50A-50D are connected to the serial clock line 53, all the serial data terminals SDA of the sensor circuits 50A-50D are connected to the serial data line 54, and all the interrupt flag output terminals INT of the sensor circuits 50A-50D are connected to the interrupt flag line 55. In this case, the serial clock line 53 and the serial data line 54 form an I²C bus (Inter-IC bus).

A microcomputer 52, that is a master device, is provided on a PCB substrate (not shown) outside the glass substrate 200. The serial clock line 53, the serial data line 54 and the interrupt flag line 55 are connected to the microcomputer 52 through an FPC (Flexible Printed Circuits) 56. With the structure described above, it is made possible that data communication is performed between the microcomputer 52 and the sensor circuits 50A-50D. Although the microcomputer 52 is used as the master device in the structure shown in FIG. 6, a master device other than the microcomputer such as a DSP (Digital Signal Processor) or a logic circuit may be used to implement the structure.

Next, the system structure of the sensor circuits 50A-50D is described referring to FIG. 6. Although only the sensor circuit 50A is shown in FIG. 6, each of the other sensor circuits 50B-50D has the same structure as shown in FIG. 6.

The sensor circuit 50A is structured to include a selection circuit 33, an electric charge amplifier 34, a 16-bit delta sigma A/D converter 35, a drive circuit 36, a control circuit 37, an I²C interface circuit 38, a reference voltage generation circuit 39, a power-on reset circuit 40, an oscillator 41, an adjustment circuit 42, an EEPROM 43, an interrupt flag output circuit 44, the first through fourth input terminals CIN1-CIN4, the drive terminal CDRV, the serial clock terminal SCL, the serial data terminal SDA, a power supply terminal VDD, a ground terminal VSS and the interrupt flag output terminal INT.

Each of the first through fourth input terminals CIN1-CIN4 is connected to each of the X lines XL1-XL4, respectively, as described above. The selection circuit 33 selects the first and second input terminals CIN1 and CIN2 in a phase 1, and selects the third and fourth input terminals CIN3 and CIN4 in a phase 2.

Outputs of the selection circuit 33 are inputted to the electric charge amplifier 34. The electric charge amplifier 34 has the same structure as the electric charge amplifier 17 that is described above. In the phase 1, the first and second input terminals CIN1 and CIN2 are selected by the selection circuit 33. Then, a signal from the first input terminal CIN1 is applied to a non-inverting input terminal (+) of the electric charge amplifier 34, while a signal from the second input terminal CIN2 is applied to an inverting input terminal (−) of the electric charge amplifier 34. That is, the electric charge amplifier 34 outputs a first output voltage V1 that corresponds to a difference between a capacitance between the X line XL1 and the X drive line DRXL1 and a capacitance between the X line XL3 and the X drive line DRXL1 based on the equation 5 described above.

In the phase 2, on the other hand, the third and fourth input terminals CIN3 and CIN4 are selected by the selection circuit 33. Then, a signal from the third input terminal CIN3 is applied to the non-inverting input terminal (+) of the electric charge amplifier 34, while a signal from the fourth input terminal CIN4 is applied to the inverting input terminal (−) of the electric charge amplifier 34. That is, the electric charge amplifier 34 outputs a second output voltage V2 that corresponds to a difference between a capacitance between the X line XL2 and the X drive line DRXL1 and a capacitance between the X line XL4 and the X drive line DRXL1 based on the equation 5 described above.

The delta sigma A/D converter 35 converts the first and second output voltages V1 and V2 into digital values. The control circuit 37 controls whole signal processing within the sensor circuit 50A. Output data of the delta sigma A/D converter 35 is converted into serial data in a predetermined format by the I²C interface circuit 38 and transmitted to the microcomputer 52 through the serial clock terminal SCL and the serial data terminal SDA.

The drive circuit 36 is structured to include the alternating current power supply 16 described above, and provides the X drive line DRXL1 in the touch panel 51 with the alternating voltage through the drive terminal CDRV. The reference voltage generation circuit 39 generates the reference voltage Vref that is used in the drive circuit 36.

The power-on reset circuit 40 resets the system when the power supply is turned on. The oscillator 41 generates a system clock. The adjustment circuit 42 adjusts an amount of offset of the electric charge amplifier 34. The EEPROM 43 is a memory to store adjustment data to adjust the amount of offset.

The interrupt flag output circuit 44 outputs an interrupt flag to the microcomputer 52 through the interrupt flag output terminal INT when the signal processing in the sensor circuit 50A described above, that is, the signal processing by the electric charge amplifier 34 and the delta sigma A/D converter 35 is completed.

The operations of the sensor circuit 50A are hereafter explained referring to Table 1 and FIG. 7.

TABLE 1

| Line | Phase 1 V1 | Phase 2 V2 |
|---|---|---|
| XL1 | +1 | 0 |
| XL2 | 0 | +1 |
| XL3 | −1 | 0 |
| XL4 | 0 | −1 |

First, when the finger of the operator touches the X line XL1, the first output voltage V1 of the electric charge amplifier 34 in the phase 1 becomes a positive (+) value. This is because the capacitance between the X line XL1 and the X drive line DRXL1 becomes larger than the capacitance between the X line XL3 and the X drive line DRXL1. And the second output voltage V2 of the electric charge amplifier 34 in the phase 2 becomes 0 V. This is because there is no change in the capacitance of the X line XL2 or XL4 since the finger of the operator is touching the X line XL1.

Next, when the finger of the operator touches the X line XL2, the first output voltage V1 of the electric charge amplifier 34 in the phase 1 becomes 0 V. This is because there is no change in the capacitance of the X line XL1 or XL3. And the second output voltage V2 of the electric charge amplifier 34 in the phase 2 becomes a positive (+) value. This is because the capacitance between the X line XL2 and the X drive line DRXL1 becomes larger than the capacitance between the X line XL4 and the X drive line DRXL1.

Next, when the finger of the operator touches the X line XL3, the first output voltage V1 of the electric charge amplifier 34 in the phase 1 becomes a negative (−) value. This is because the capacitance between the X line XL3 and the X drive line DRXL1 becomes larger than the capacitance between the X line XL1 and the X drive line DRXL1. And the second output voltage V2 of the electric charge amplifier 34 in the phase 2 becomes 0 V. This is because there is no change in the capacitance of the X line XL2 or XL4 since the finger of the operator is touching the X line XL3.

Finally, when the finger of the operator touches the X line XL4, the first output voltage V1 of the electric charge amplifier 34 in the phase 1 becomes 0 V. This is because there is no change in the capacitance of the X line XL1 or XL3. And the second output voltage V2 of the electric charge amplifier 34 in the phase 2 becomes a negative (−) value. This is because the capacitance between the X line XL4 and the X drive line DRXL1 becomes larger than the capacitance between the X line XL2 and the X drive line DRXL1. Note that the maximum absolute values of the first and second output voltages V1 and V2 are normalized to 1 as shown in FIG. 7 for the sake of convenience of the explanation.

Also, FIG. 7 shows that the first and second output voltages V1 and V2 of the electric charge amplifier 34 vary continuously in accordance with the change in the touch position. That is, making a point on the X line XL1 in FIG. 5 as an origin in FIG. 7 and making the Y coordinate axis in FIG. 5 as a horizontal axis in FIG. 7, the first output voltage V1 is approximated by V1=cos Y, and the second output voltage V2 is approximated by V2=sin Y. Therefore, it is possible to detect the touch position (Y coordinate) based on the first and second output voltages V1 and V2.

To show an example, since an equation V2/V1=tan Y holds, the Y coordinate of the touch position can be obtained using an equation Y=arctan (V2/V1) and polarities (+,−) of the first and second output voltages V1 and V2. Here, arctan is an inverse function of tan. In this case, the first and second output voltages V1 and V2 are converted into digital values by the delta sigma A/D converter 35 and transmitted to the microcomputer 52 through the I²C interface circuit 38 as described above. The Y coordinate of the touch position can be obtained by performing the calculation described above with the microcomputer 52.

Similarly, the touch positions on the X lines XL5-XL8 can be detected based on the first and second output voltages V1 and V2 of the electric charge amplifier 34 through the operations of the sensor circuit 50B. Also, the touch positions on the Y lines YL1-YL4 can be detected based on the first and second output voltages V1 and V2 of the electric charge amplifier 34 through the operations of the sensor circuit 50C, and the touch positions on the Y lines YL5-YL8 can be detected through the operations of the sensor circuit 50D.

Therefore, the X coordinate and the Y coordinate of the touch position on the touch panel 51 can be obtained through the operations of the four sensor circuits 50A-50D.

Figure 8:
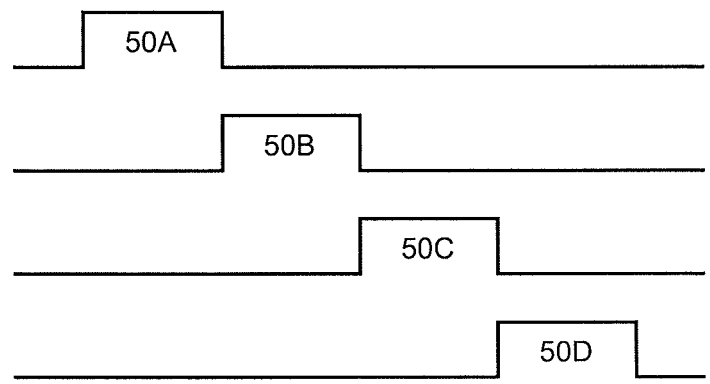
FIG. 8 is a timing chart showing operations of the signal processing circuit of the electrostatic capacity type touch panel according to the first embodiment of this invention.

Next, an example of an operational sequence of the four sensor circuits 50A-50D is explained. As shown in FIG. 8, each of the four sensor circuits 50A-50D is sequentially selected using a unique device addresses. Each of the four sensor circuits 50A-50D is given each of the unique addresses, respectively, which are different from each other and stored in the EEPROM 43. The microcomputer 52 sends the device address to the serial data line 54. Each of the control circuits 37 in the sensor circuits 50A-50D receives the device address sent from the microcomputer 52 through corresponding each of the I²C interface circuit 38. Now, the explanation is given to the case where the device address sent from the microcomputer 52 coincides with the device address of the sensor circuit 50A. In this case, the control circuit 37 in the sensor circuit 50A detects the coincidence of the device address, and the sensor circuit 50A is put into operation.

When the signal processing by the sensor circuit 50A, which is described above, is completed, the interrupt flag output circuit 44 in the sensor circuit 50A outputs the interrupt flag. The interrupt flag is transmitted to the microcomputer 52 through the interrupt flag output terminal INT and the interrupt flag line 55. At that time, an output impedance of the interrupt flag output circuit 44 in each of the sensor circuits 50B, 50C and 50D that are not selected by the microcomputer 52 is set to a high impedance state by corresponding each of the control circuits 37, respectively. As a result, the interrupt flag from the interrupt flag output circuit 44 in the sensor circuit 50A is prevented from mutual interference among the interrupt flag output circuits 44 in the sensor circuits 50A-50D, and properly transmitted to the microcomputer 52.

The microcomputer 52 that has received the interrupt flag from the sensor circuit 50A reads the digitized first and second output voltages V1 and V2, which are detection signals of the sensor circuit 50A. That is, the microcomputer 52 transmits a read command to the sensor circuit 50A through the serial data line 54. The sensor circuit 50A that has received the read command serially outputs the digitized data of the first and second output voltages V1 and V2 to the microcomputer 52 through the serial data line 54.

The microcomputer 52 that has received the digitized data of the first and second output voltages V1 and V2 performs the calculation described above to find the X coordinate of the touch position on the touch panel 51. The X and Y coordinates of the touch position on the touch panel 51 can be obtained by performing the operational sequence described above on the other three sensor circuits 50B-50D one after another.

Figure 9:
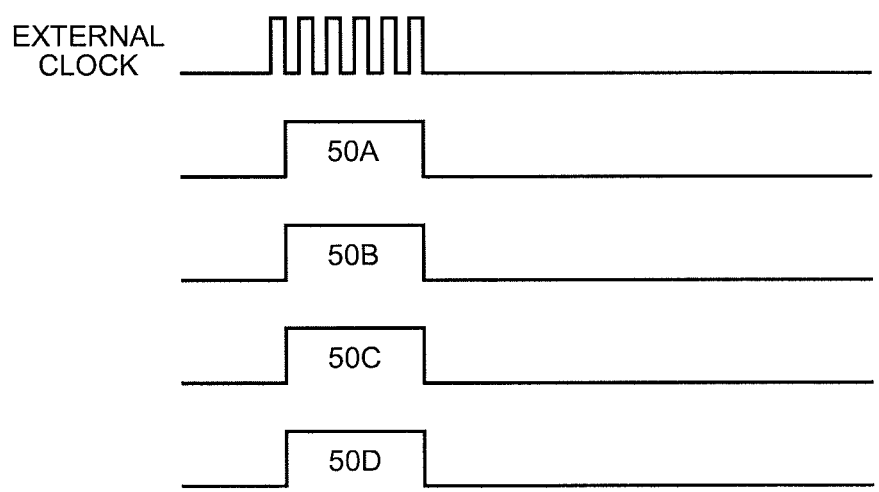
FIG. 9 is a timing chart showing operations of a signal processing circuit of an electrostatic capacity type touch panel according to a second embodiment of this invention.

While the four sensor circuits 50A-50D are sequentially selected as shown in FIG. 8 in the signal processing circuit according to the first embodiment of this invention, the four sensor circuits 50A-50D are simultaneously selected in synchronization with an external clock as shown in FIG. 9 in a signal processing circuit according to a second embodiment of this invention. By doing so, detection time of the touch position on the touch panel 51 is reduced.

Figure 10:
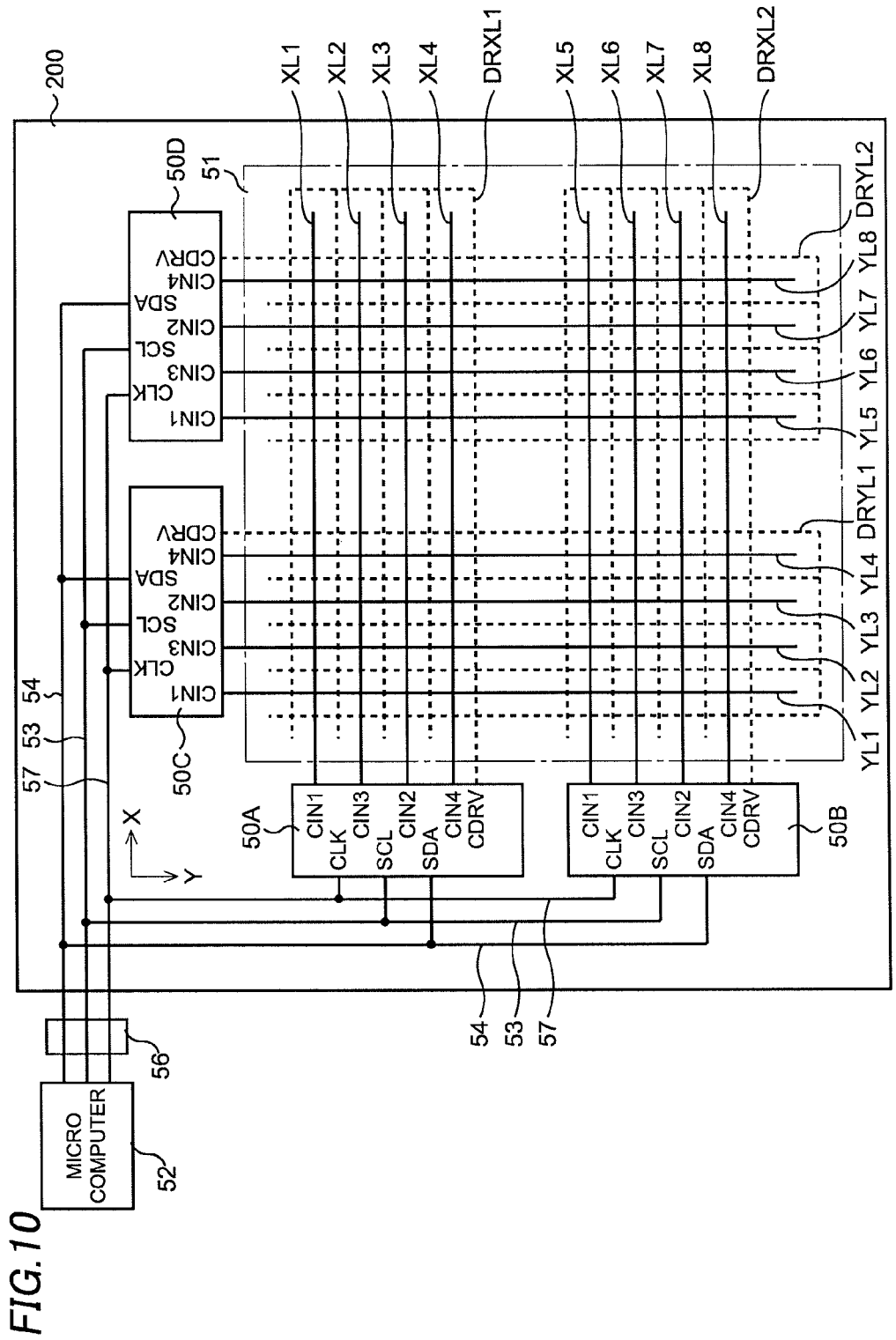
FIG. 10 shows the signal processing circuit of the electrostatic capacity type touch panel according the second embodiment of this invention.

In order to realize such operations, each of the sensor circuits 50A-50D has an external clock input terminal CLK instead of the interrupt flag output terminal INT, as shown in FIG. 10. All the clock input terminals CLK of the sensor circuits 50A-50D are connected to an external clock line 57 on the glass substrate 200. The external clock line 57 is connected to the microcomputer 52 through the FPC 56. Thus, the microcomputer 52 provides the external clock input terminal CLK of each of the sensor circuits 50A-50D with the external clock through the external clock line 57.

Figure 11:
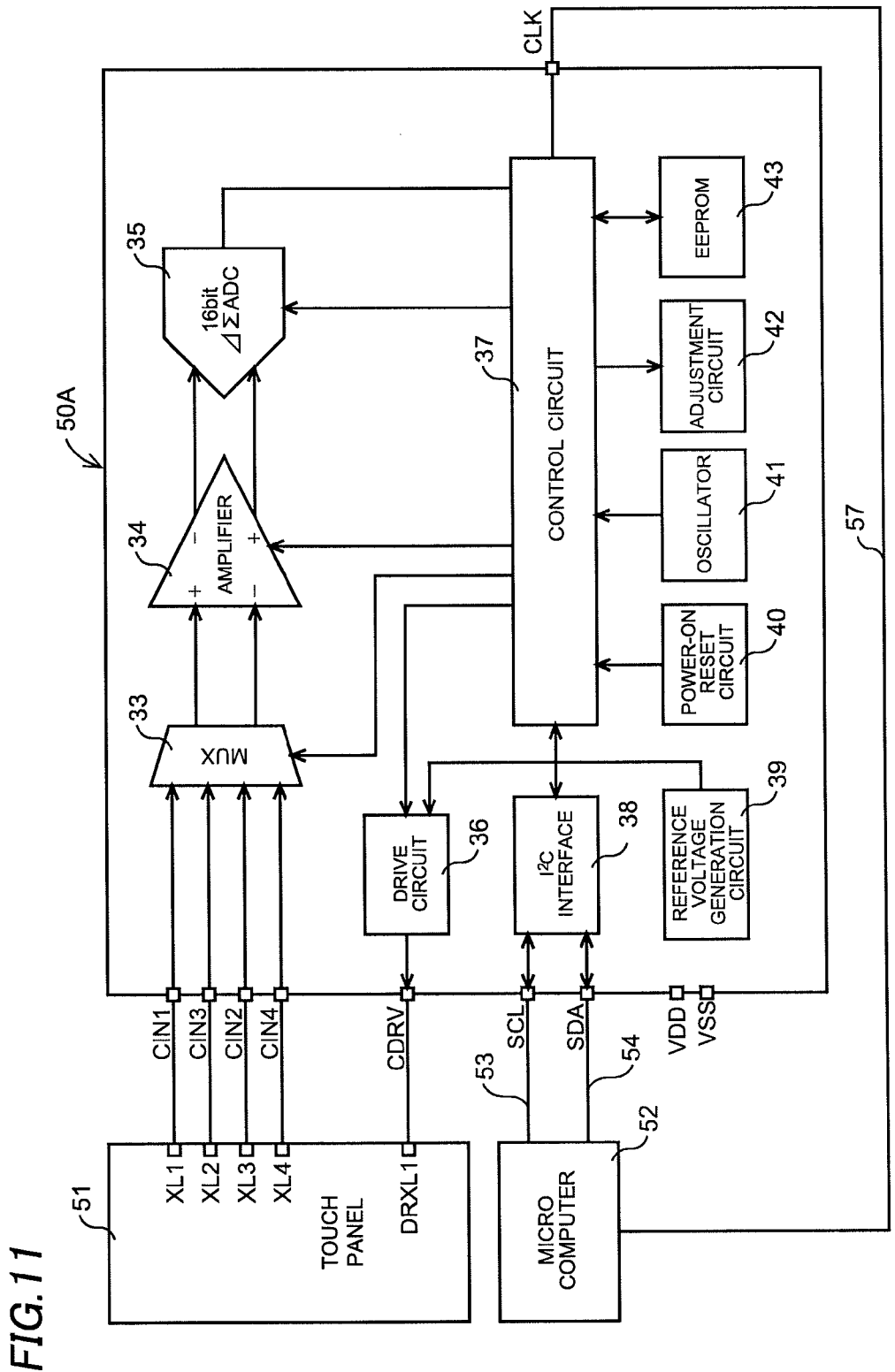
FIG. 11 shows a system structure of a sensor circuit.
Figure 12:
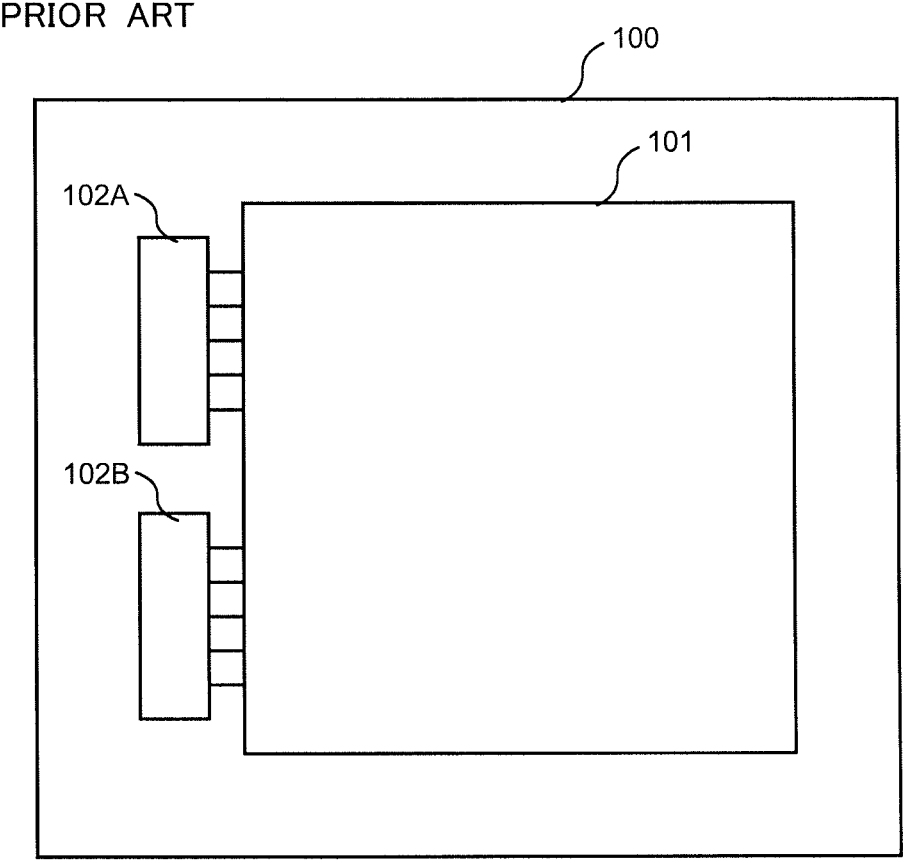
FIG. 12 shows a conventional signal processing circuit of an electrostatic capacity type touch panel.

The external clock inputted to the external clock input terminal CLK is provided to the control circuit 37 in corresponding each of the sensor circuits 50A-50D, as shown in FIG. 11. The control circuit 37 in each of the sensor circuits 50A-50D makes corresponding each of the sensor circuits 50A-50D operate in synchronization with the external clock.

When the signal processing by the sensor circuits 50A-50D, which is described above, is completed, the microcomputer 52 reads the digitized data of the first and second output voltages V1 and V2, which are detection signals of the sensor circuits 50A-50D, one after another.

That is, the microcomputer 52 first transmits the read command to the sensor circuit 50A through the serial data line 54. The sensor circuit 50A that has received the read command serially outputs the digitized data of the first and second output voltages V1 and V2 to the microcomputer 52 through the serial data line 54.

Next, the microcomputer 52 transmits the read command to the sensor circuit 50B through the serial data line 54. The sensor circuit 50B that has received the read command serially outputs the digitized data of the first and second output voltages V1 and V2 to the microcomputer 52 through the serial data line 54. Similar operations are performed regarding the sensor circuits 50C and 50D.

Then, the microcomputer 52 that has received the digitized data of the first and second output voltages V1 and V2 performs the calculation described above to find the X and Y coordinates of the touch position on the touch panel 51.

The sensor circuits 50A-50D are formed on the glass substrate 200 using the COG technology in the signal processing circuits according to the first and second embodiments. This invention is not limited to the above, and the sensor circuits 50A-50D may be formed on a PCB substrate other than the glass substrate 200 and the sensor circuits 50A-50D and the touch panel 51 may be connected through wirings.

Also, although the sensor circuits 50A-50D and the microcomputer 52 are connected through the I²C serial interface in the signal processing circuits according to the first and second embodiments, they may be connected through other serial interface such as a three-line interface formed of a serial data line, a clock line and an enable line. Also, a parallel interface may be used instead of the serial interface.

With the signal processing circuit of the electrostatic capacity type touch panel according to the embodiments of this invention, duplication of the components can be eliminated and the component cost can be reduced.

What is claimed is:

1. A signal processing circuit of an electrostatic capacity type touch panel, comprising:
   a first sensor circuit having a first drive terminal and a plurality of first sensor input terminals, wherein the first sensor circuit provides a first driving signal at the drive terminal of the first sensor circuit;
   a first plurality of sense lines disposed on a substrate, wherein a first sense line of the first plurality of sense lines has a first side, a second side, and a first terminal coupled to a first input terminal of the plurality of first sensor input terminals and a second sense line of the first plurality of sense lines has a first side, a second side, and a first terminal coupled to a second input terminal of the plurality of first sensor input terminals;
   a first drive line comprising a first section having a first terminal, a second section having a second terminal, and a third section having a third terminal, the second terminal of the first drive line electrically separated from the third terminal of the first drive line, the first terminal of the first drive line coupled to the drive terminal of the first sensor circuit, the first section of the first drive line adjacent the first side of the first sense line of the first plurality of sense lines, the second section of the first drive line adjacent the second side of the first sense line of the first plurality of sense lines and first side of the second sense line of the first plurality of sense lines;
   a second sensor circuit having a drive terminal and a plurality of second sensor input terminals, wherein the second sensor circuit provides a second driving signal at the drive terminal of the second sensor circuit;
   a second plurality of sense lines disposed on the substrate and intersecting with the first plurality of sense lines, wherein a first sense line of the second plurality of sense lines has a first side, a second side, and a first terminal coupled to a first input terminal of the second plurality of sense lines;
   a second drive line comprising a first section having a first terminal and a second section having a second terminal, the first terminal of the second drive line coupled to the drive terminal of the second sensor circuit, the first section of the second drive line adjacent the first side of the first sense line of the second plurality of sense lines, the second section of the first sense line adjacent the second side of the first sense line of the second plurality of sense lines, the second drive line electrically insulated from the first drive line, wherein the first sensor circuit provides a first driving signal on the first drive line and detects a change in a capacitance between one of the first sense line of the first plurality of sense lines or the second sense line of the first plurality of sense lines and the first drive line and outputting a first detection signal and produces a first digital value that indicates which one of the first plurality of sense lines at which the change in capacitance is detected and wherein the
   second sensor circuit provides a second driving signal on the second drive line and detects a change in a capacitance between one of the first sense of the second plurality of sense lines or the second sense line of the second plurality of sense lines and the second drive line and outputting a second detection signal and produces a second digital value that indicates which one of the second plurality of sense lines at which the change in capacitance is detected; and
   a bus connected to the first and second sensor circuits, the first and second sensor circuits outputting the first and second detection signals to the bus so that data communication is performed between a master device and the first and second sensor circuits through the bus;
   wherein the master device enables the first and second sensor circuits simultaneously via a clock signal coupled to both the first and second sensor circuits, and wherein the master device reads the first and second digital values, respectively, from the first and second sensor circuits serially over the bus.

2. The signal processing circuit of claim 1, wherein the bus comprises an I²C bus.

3. The signal processing circuit of claim 1, further comprising:
a first drive circuit in the first sensor circuit that supplies a first alternating voltage to the first drive line; and
a second drive circuit in the second sensor circuit that supplies a second alternating voltage to the second drive line.

4. The signal processing circuit of claim 3, wherein the first and second alternating voltages are clock signals.

5. The signal processing circuit of claim 4, wherein the first sensor circuit has a first electric charge amplifier having an output based on a capacitance differential between two sense lines of the first plurality of sense lines and the second sensor has a second electric charge amplifier having an output based on a capacitance differential between two sense lines of the second plurality of sense lines, and wherein the digital value for each of the first and second sensor circuits is based on an output value of the electric charge amplifiers of the first and second sensor circuits, respectively.

6. The signal processing circuit of claim 1, wherein the substrate is glass, the first and second sensor circuits are formed on the glass using chip on glass mounting.

7. The signal processing circuit of claim 1, wherein the first plurality of sense lines comprises four sense lines, and the second plurality of sense lines comprises four sense lines.

8. The signal processing circuit of claim 1, further comprising:
a third sensor circuit having a third drive terminal and a plurality of third sensor input terminals, wherein the third sensor circuit provides a third driving signal at the drive terminal of the third sensor circuit;
a third plurality of sense lines oriented in parallel with the first plurality of sense lines, wherein a first sense line of the third plurality of sense lines has a first side, a second side, and a first terminal coupled to a first input terminal of the plurality of third sensor input terminals and a second sense line of the third plurality of sense lines has a first side, a second side, and a first terminal coupled to a second input terminal of the plurality of third sensor input terminals;
a third drive line comprising a first section having a first terminal, a second section having a second terminal, and a third section having a third terminal, the second terminal of the third drive line electrically separated from the third terminal of the third drive line, the first terminal of the third drive line coupled to the drive terminal of the third sensor circuit, the first section of the third drive line adjacent the first side of a third sense line of the third plurality of sense lines, the second section of the third drive line adjacent the second side of the first sense line of the third plurality of sense lines and first side of the second sense line of the third plurality of sense lines;
a fourth sensor circuit having a drive terminal and a plurality of fourth sensor input terminals, wherein the fourth sensor circuit provides a fourth driving signal at the drive terminal of the fourth sensor circuit;
a fourth plurality of sense lines disposed on the substrate, intersecting with the third plurality of sense lines, and oriented in parallel with the second plurality of sense lines, wherein a first sense line of the fourth plurality of sense lines has a first side, a second side, and a first terminal coupled to a first input terminal of the fourth plurality of sense lines;
a fourth drive line comprising a first section having a first terminal and a second section having a second terminal, the first terminal of the fourth drive line coupled to the drive terminal of the fourth sensor circuit, the first section of the fourth drive line adjacent the first side of the first sense line of the fourth plurality of sense lines, the second section of the fourth sense line adjacent the second side of the first sense line of the fourth plurality of sense lines, the fourth drive line electrically insulated from the first drive line, wherein
the third sensor circuit provides the third driving signal on the third drive line and detects a change in a capacitance between the first sense line of the third plurality of sense lines and the third drive line and outputting a third detection signal and produces a third digital value that indicates which one of the third plurality of sense lines at which the change in capacitance is detected and wherein the fourth sensor circuit provides the fourth driving signal on the fourth driving line and detects a change in a capacitance between the first sense line of the fourth plurality of sense lines and the fourth drive line and outputting a fourth detection signal and produces a fourth digital value that indicates which one of the fourth plurality of sense lines at which the change in capacitance is detected;
wherein the master device enables the third and fourth sensor circuits simultaneously with the first and second sensor circuits via the clock signal, and wherein the master device reads the third and fourth digital values, respectively, from the third and fourth sensor circuits serially over the bus in series with first and second sensor circuits.

9. A capacitance touch detection circuit arrangement, comprising:
a plurality of sense lines in a first direction and a plurality of sense lines in a second direction that intersect the plurality of sense lines in the first direction, wherein the plurality of sense lines in the first direction comprises:
a first set of sense lines and a second set of sense lines, wherein a first sense line of the first set of sense lines has a first side, a second side, and a first terminal and a first sense line of the second set of sense lines has a first side, a second side, and a first terminal; and wherein the plurality of sense lines in the second direction comprises:
a third set of sense lines and a fourth set of sense lines, wherein a first sense line of the third set of sense lines has a first side, a second side, and a first terminal and a first sense line of the fourth set of sense lines has a first side, a second side, and a first terminal;
a first drive line having a first terminal and a portion divided into a plurality of branches, wherein each branch has a terminal, a first branch of the first drive line adjacent a first side of the first sense line of the first set of sense lines, a second branch of the first drive line adjacent a second side of the first sense line of the first set of sense lines;
a plurality of sensor circuits for the first direction and a plurality of sensor circuits for the second direction, the first terminal of the first sense line of the first set of sense lines coupled to a first sensor circuit of the plurality of sensor circuits for the first direction, the first terminal of the first sense line of the second set of sense lines coupled to a second sensor circuit of the plurality of sensor circuits for the first direction, the first terminal of the first sense line of the third set of sense lines coupled to a first sensor circuit of the plurality of sensor circuits for the second direction, the first terminal of the first sense line of the fourth set of sense lines coupled to a second sensor circuit of the plurality of sensor circuits for the second direction, the first terminal of the first drive line coupled to a drive terminal of the first sensor circuit of the plurality of sensor circuits for the first direction to receive a first drive signal, wherein the first sensor circuit of the plurality of sensor circuits for the first direction detects a change in capacitance between one of its sense lines of the first set of sense lines and the first drive line and produces a digital value that indicates whether, and which, one of the first set of sense lines at which a change in capacitance is detected;

a master device that enables the plurality of sensor circuits simultaneously with a clock signal, and wherein the master device reads the digital values of each of the plurality of sensor circuits serially over a bus, and based on the digital values determines a touch location.

10. The capacitance touch detection circuit arrangement of claim 9, wherein the bus is an I$^2$C bus.

11. The capacitance touch detection circuit arrangement of claim 9, wherein the plurality of sense lines in the first and second directions are disposed on a glass substrate, each of the plurality of sensor circuits are mounted on the glass substrate by chip on glass.

12. The capacitance touch detection circuit arrangement of claim 9 where the first drive signal provided by the first sensor circuit of the plurality of sensor circuits is a clock signal.

13. The capacitance touch detection circuit arrangement of claim 9, wherein each sensor circuit comprises:
an electric charge amplifier having a first input, a second input, and an output;
a selection circuit that connects a first one of the first set of sense lines of the plurality of sense lines in the first direction to the first input of the electric charge amplifier and a third one of the first set of sense lines of the plurality of sense lines in the first direction to the second input of the electric charge amplifier during a first phase, and connects a second one of the first set of sense lines of the plurality of sense lines in the first direction to the first input of the electric charge amplifier and a fourth one of the first set of sense lines of the plurality of sense lines in the first direction to the second input of the electric charge amplifier during a second phase; and
an analog to digital converter that converts the output of the electric charge amplifier to a digital value for each of the first and second phases to produce the digital value.

14. The capacitance touch detection circuit arrangement of claim 9, wherein each sensor circuit comprises an electrically erasable programmable read only memory in which the digital value is stored.

15. The capacitance touch detection circuit arrangement of claim 9, wherein each sensor circuit comprises:
a reference voltage generation circuit that generates a reference voltage; and
a drive circuit that alternately connects the reference voltage to the drive line during a first phase and connects a ground to the drive line during a second phase.

16. A touch panel, comprising:
a substrate;
a first sensor circuit and a second sensor circuit, wherein the first sensor circuit is configured for sensing in a first direction and the second sensor circuit is configured for sensing in a second direction, wherein the first sensor circuit is connected to a first plurality of sense lines in the first direction and the first sensor circuit is connected to a first drive line, and the second sensor circuit is connected to a second plurality of sense lines in a second direction over the substrate and the second sensor circuit is connected to a second drive line, wherein the first plurality of sense lines in the first direction comprises:
a first set of sense lines, wherein a first sense line of the first set of sense lines has a first side, a second side, and a first terminal; and wherein the second plurality of sense lines in the second direction comprises:
a second set of sense lines, wherein a first sense line of the second set of sense lines has a first side, a second side, and a first terminal; and wherein the first drive line connected to the first sensor circuit has a first terminal and a portion divided into a plurality of branches, wherein each branch has a terminal, a first branch of the first drive line adjacent a first side of the first sense line of the first set of sense lines, a second branch of the first drive line adjacent a second side of the first sense line of the first set of sense lines, and wherein the terminals of each branch of the first drive line are electrically isolated from each other; and wherein the second drive line connected to the second sensor circuit has a first terminal and a portion divided into a plurality of branches, wherein each branch has a terminal, a first branch of the second drive line adjacent a first side of the first sense line of the second set of sense lines, a second branch of the second drive line adjacent a second side of the first sense line of the second set of sense lines, and wherein the terminals of each branch of the second drive line are electrically isolated from each other;
a third sensor circuit and a fourth sensor circuit, wherein the third sensor circuit is configured for sensing in the first direction and the fourth sensor circuit is configured for sensing in the second direction, wherein the third sensor circuit is connected to a third plurality of sense lines in the first direction and the third sensor circuit is connected to a third drive line, wherein the third drive line connected to the third sensor circuit has a first terminal and a portion divided into a plurality of branches, wherein each branch has a terminal, and wherein the terminals of each branch of the third drive line are electrically isolated from each other, and the fourth sensor circuit is connected to a fourth plurality of sense lines in the second direction and the fourth sensor circuit is connected to a fourth drive line, wherein the fourth drive line connected to the fourth sensor circuit has a first terminal and a portion divided into a plurality of branches, wherein each branch has a terminal, and wherein the terminals of each branch of the fourth drive line are electrically isolated from each other; wherein each of the at least first through fourth sensor circuits are simultaneously enabled by a master device to produce a digital value indicative of whether, and which, respective sense line to which it is connected indicates a change in capacitance, and wherein the master device reads the respective digital value of each sensor circuit serially.

17. The touch panel of claim 16, wherein the substrate is glass and each of the sensor circuits are mounted via chip on glass.

18. The touch panel of claim 16, wherein each sensor circuit is connected to four sense lines.

19. The touch panel of claim 18, wherein each sensor circuit includes an electric charge amplifier that compares a first and third sense line during a first phase, and compares a second and fourth sense line during a second phase.

20. The touch panel of claim 19, wherein each sensor circuit includes an adjustment circuit for adjusting an offset of the electric charge amplifier.

* * * * *